US012606208B2

(12) United States Patent
Toba et al.

(10) Patent No.: US 12,606,208 B2
(45) Date of Patent: Apr. 21, 2026

(54) EDGE DEVICE AND DISTRIBUTED SYSTEM

(71) Applicant: Hitachi, Ltd., Tokyo (JP)

(72) Inventors: Tadanobu Toba, Tokyo (JP); Kenichi Shimbo, Tokyo (JP); Yutaka Uematsu, Tokyo (JP); Takumi Uezono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 153 days.

(21) Appl. No.: 18/111,010

(22) Filed: Feb. 17, 2023

(65) Prior Publication Data

US 2023/0286542 A1     Sep. 14, 2023

(30) Foreign Application Priority Data

Mar. 10, 2022     (JP) ................................. 2022-037258

(51) Int. Cl.
B60W 50/00          (2006.01)
B60W 60/00          (2020.01)

(52) U.S. Cl.
CPC ....... B60W 60/0015 (2020.02); B60W 60/001 (2020.02); B60W 2555/20 (2020.02);
(Continued)

(58) Field of Classification Search
CPC ........... B60W 60/0015; B60W 60/001; B60W 2555/20; B60W 2556/10; B60W 2556/40;
(Continued)

(56) References Cited

U.S. PATENT DOCUMENTS

2017/0113664 A1* 4/2017 Nix ...................... G07C 5/0891
2019/0026796 A1* 1/2019 Dinis da Silva de Carvalho ........ G06Q 50/40

(Continued)

FOREIGN PATENT DOCUMENTS

JP        2002-302015 A     10/2002
JP        2012-190072 A     10/2012
(Continued)

OTHER PUBLICATIONS

Office Action mailed Sep. 24, 2024 in Japanese Application No. 2022-037258.

*Primary Examiner* — Ramya P Burgess
*Assistant Examiner* — Chanmin Park
(74) *Attorney, Agent, or Firm* — Miles & Stockbridge, P.C.

(57)          ABSTRACT

Provided are an edge device and a distributed system capable of efficiently collecting situation data when an unexpected event occurs in an automatically operable moving body and contributing to improvement of safety. An edge device according to the invention includes: a sensor provided in an automatically operable moving body; a recognition unit configured to recognize an object based on input data from the sensor; a determination unit configured to determine a recognition result of the recognition unit; a drive mechanism control unit configured to control the drive mechanism based on a determination result of the determination unit; an unexpected event determination unit configured to determine whether an unexpected event has occurred based on information from the recognition unit and the determination unit; a data shaping unit in which when it is determined that an unexpected event has occurred, the data shaping unit shapes, as communication data, a recognition result of the recognition unit, or the input data used for recognition by the recognition unit, and a determination result of the determination unit, or a calculation history up to the determination result; and a communication unit configured to transmit, to the cloud server, the communication data shaped by the data shaping unit.

7 Claims, 11 Drawing Sheets

(52) U.S. Cl.
CPC ..... *B60W 2556/10* (2020.02); *B60W 2556/40*
(2020.02); *B60W 2556/45* (2020.02)

(58) Field of Classification Search
CPC ......... B60W 2556/45; B60W 2756/10; B60W
30/0956; B60W 2050/0088; B60W
60/0027; B60W 2554/4041; B60W
2554/4042; B60W 2554/4043; B60W
2554/802
See application file for complete search history.

(56) References Cited

U.S. PATENT DOCUMENTS

| | | | |
|---|---|---|---|
| 2020/0317266 A1 | 10/2020 | Kunihiro et al. | |
| 2022/0161816 A1* | 5/2022 | Gyllenhammar ...... | G06V 20/56 |
| 2023/0040552 A1 | 2/2023 | Lee et al. | |
| 2023/0202530 A1* | 6/2023 | Abad .................. | G08G 1/0133 |
| | | | 701/26 |

FOREIGN PATENT DOCUMENTS

| | | |
|---|---|---|
| JP | 2019-021201 A | 2/2019 |
| JP | 2020-168955 A | 10/2020 |
| WO | 2021101302 A1 | 5/2021 |

* cited by examiner

FIG. 4

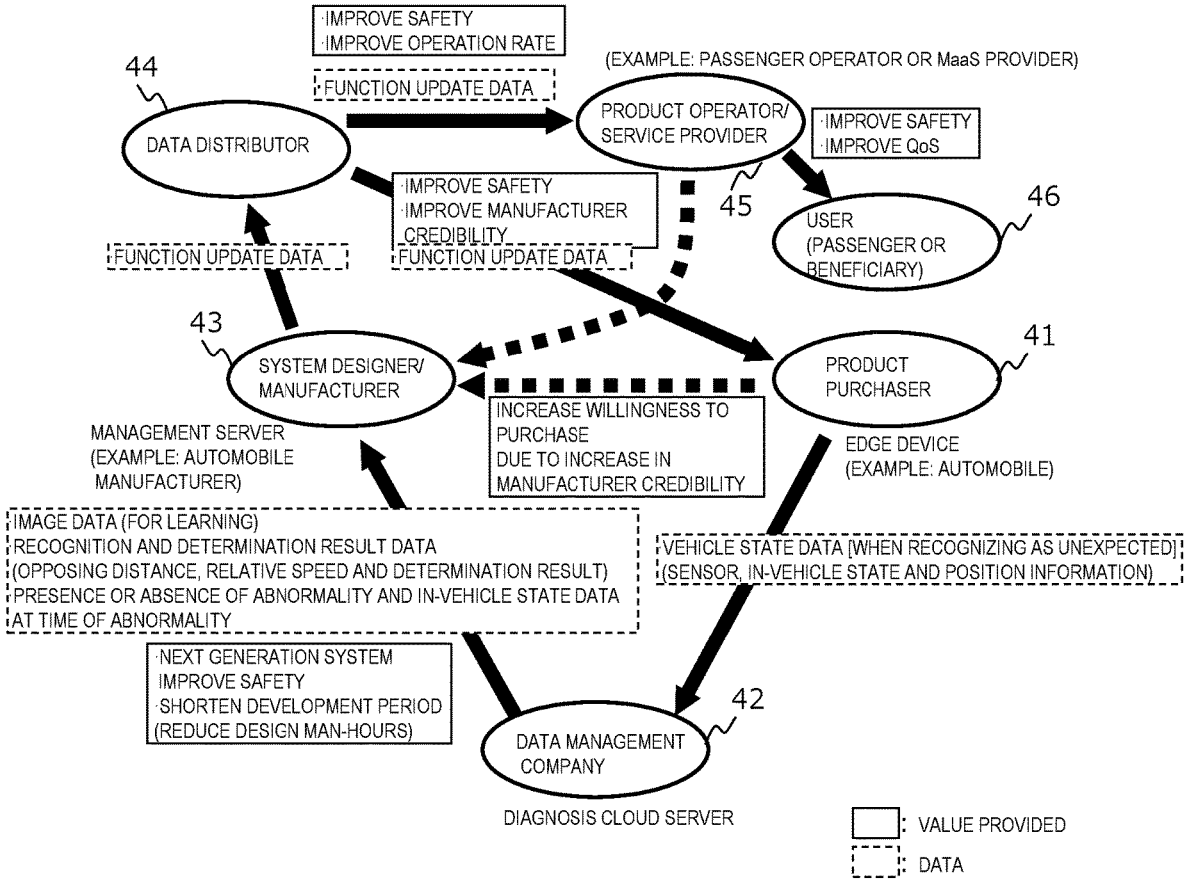

IMPROVE SAFETY
IMPROVE OPERATION RATE

44

FUNCTION UPDATE DATA (EXAMPLE: PASSENGER OPERATOR OR MaaS PROVIDER)

DATA DISTRIBUTOR

PRODUCT OPERATOR/
SERVICE PROVIDER

IMPROVE SAFETY
IMPROVE QoS

45

IMPROVE SAFETY
IMPROVE MANUFACTURER
CREDIBILITY

46

USER
(PASSENGER OR
BENEFICIARY)

FUNCTION UPDATE DATA    FUNCTION UPDATE DATA

43

SYSTEM DESIGNER/
MANUFACTURER

41

PRODUCT
PURCHASER

INCREASE WILLINGNESS TO
PURCHASE
DUE TO INCREASE IN
MANUFACTURER CREDIBILITY

EDGE DEVICE
(EXAMPLE: AUTOMOBILE)

MANAGEMENT SERVER
(EXAMPLE: AUTOMOBILE
MANUFACTURER)

IMAGE DATA (FOR LEARNING)
RECOGNITION AND DETERMINATION RESULT DATA
(OPPOSING DISTANCE, RELATIVE SPEED AND DETERMINATION RESULT)
PRESENCE OR ABSENCE OF ABNORMALITY AND IN-VEHICLE STATE DATA
AT TIME OF ABNORMALITY

VEHICLE STATE DATA [WHEN RECOGNIZING AS UNEXPECTED]
(SENSOR, IN-VEHICLE STATE AND POSITION INFORMATION)

NEXT GENERATION SYSTEM
IMPROVE SAFETY
SHORTEN DEVELOPMENT PERIOD
(REDUCE DESIGN MAN-HOURS)

42

DATA MANAGEMENT
COMPANY

DIAGNOSIS CLOUD SERVER

: VALUE PROVIDED

: DATA

*FIG. 7*

| ROAD SHAPE | OPERATION | SURROUNDING SITUATION |
|---|---|---|
| ·LANE SHAPE<br>·MERGING ROAD<br>·BRANCHING ROAD<br>·THREE-IMENSIONAL ROAD | ·MAINTAIN LANE<br>·CHANGE LANE | ·CUT-IN<br>·CUT-OUT<br>·ACCELERATION<br>·DECELERATION<br>·SYNCHRONIZATION |

S901

RECEIVE DATA ON UNEXPECTED EVENT

S902

EVENT CLASSIFICATION PROCESSING

→WHEN PREDETERMINED EVENT OCCURS:

S903

GENERATE ADDITIONAL LEARNING DATA BASED ON RECEIVED DATA

S904

EXTRACT INPUT DATA FROM SENSOR

S905

UPDATE PARAMETERS

EDGE DEVICE AND DISTRIBUTED SYSTEM

CLAIM OF PRIORITY

The present application claims priority from Japanese Patent application serial no. 2022-37258, filed on Mar. 10, 2022, the content of which is hereby incorporated by reference into this application.

BACKGROUND OF THE INVENTION

1. Field of the Invention

The present invention relates to an edge device and a distributed system.

2. Description of the Related Art

There is known an electronic system that supports control over a drive mechanism provided in an automatically operable moving body such as an automatic driving vehicle or a robot. For example, JP-A-2020-168955 discloses a vehicle control device that estimates a disturbance such as a crosswind to a vehicle and changes a content of driving support based on an estimation result of the disturbance.

However, the technique disclosed in JP-A-2020-168955 merely relates to determination of whether there is disturbance that affects traveling of the vehicle and driving support corresponding thereto, and it is not assumed that situation data at the time of disturbance is collected.

SUMMARY OF THE INVENTION

An object of the invention is to provide an edge device and a distributed system capable of efficiently collecting situation data when an unexpected event occurs in an automatically operable moving body and contributing to improvement of safety.

In order to solve the above problems, an edge device according to the invention is an edge device that is connected to a cloud server configured to collect data on an automatically operable moving body via a network and supports control over a drive mechanism provided in the automatically operable moving body. The edge device includes: a sensor provided in the automatically operable moving body; a recognition unit configured to recognize an object based on input data from the sensor; a determination unit configured to determine a recognition result of the recognition unit; a drive mechanism control unit configured to control the drive mechanism based on a determination result of the determination unit; an unexpected event determination unit configured to determine whether an unexpected event has occurred based on information from the recognition unit and the determination unit; a data shaping unit in which when it is determined that an unexpected event has occurred, the data shaping unit shapes, as communication data, a recognition result of the recognition unit, or the input data used for recognition by the recognition unit, and a determination result of the determination unit, or a calculation history up to the determination result; and a communication unit configured to transmit, to the cloud server, the communication data shaped by the data shaping unit.

According to the invention, it is possible to provide an edge device and a distributed system capable of efficiently collecting situation data when an unexpected event occurs in an automatically operable moving body and contributing to improvement of safety.

Problems, configurations, and effects other than those described above will be apparent from the following description of embodiments.

BRIEF DESCRIPTION OF THE DRAWINGS

FIG. 4 is a conceptual diagram showing an example of an automatic driving vehicle service using the distributed system.

FIG. 7 is a table showing types of unexpected events that occur in the automatic driving vehicle due to a relationship with another vehicle.

DESCRIPTION OF THE PREFERRED EMBODIMENTS

Hereinafter, embodiments of the invention will be described with reference to the drawings. The embodiments are examples for describing the invention, and are appropriately omitted and simplified to clarify the description. The invention can be implemented in various other forms. Unless otherwise specified, each component may be singular or plural.

Processing executed by executing a program may be described in the embodiments. Here, a computer executes a program by a processor (such as a CPU or a GPU), and executes processing defined by the program while using a storage resource (such as a memory), an interface device (such as a communication port), or the like. Therefore, the processor may be a subject of the processing executed by executing the program. Similarly, the subject of the processing executed by executing the program may be a controller, a device, a system, a computer, or a node including a processor. The subject of the processing executed by executing the program may be an arithmetic unit, and may include a dedicated circuit that executes specific processing. Here, the dedicated circuit is, for example, a field programmable gate array (FPGA), an application specific integrated circuit (ASIC), or a complex programmable logic device (CPLD).

The program may be installed in the computer from a program source. The program source may be, for example, a program distribution server or a computer-readable storage medium. When the program source is a program distribution server, the program distribution server may include a processor and a storage resource that stores a program to be distributed, and the processor of the program distribution server may distribute the program to be distributed to another computer. In the embodiments, two or more programs may be implemented as one program, or one program may be implemented as two or more programs.

First Embodiment (Overall Configuration of Distributed System)

Figure 1:
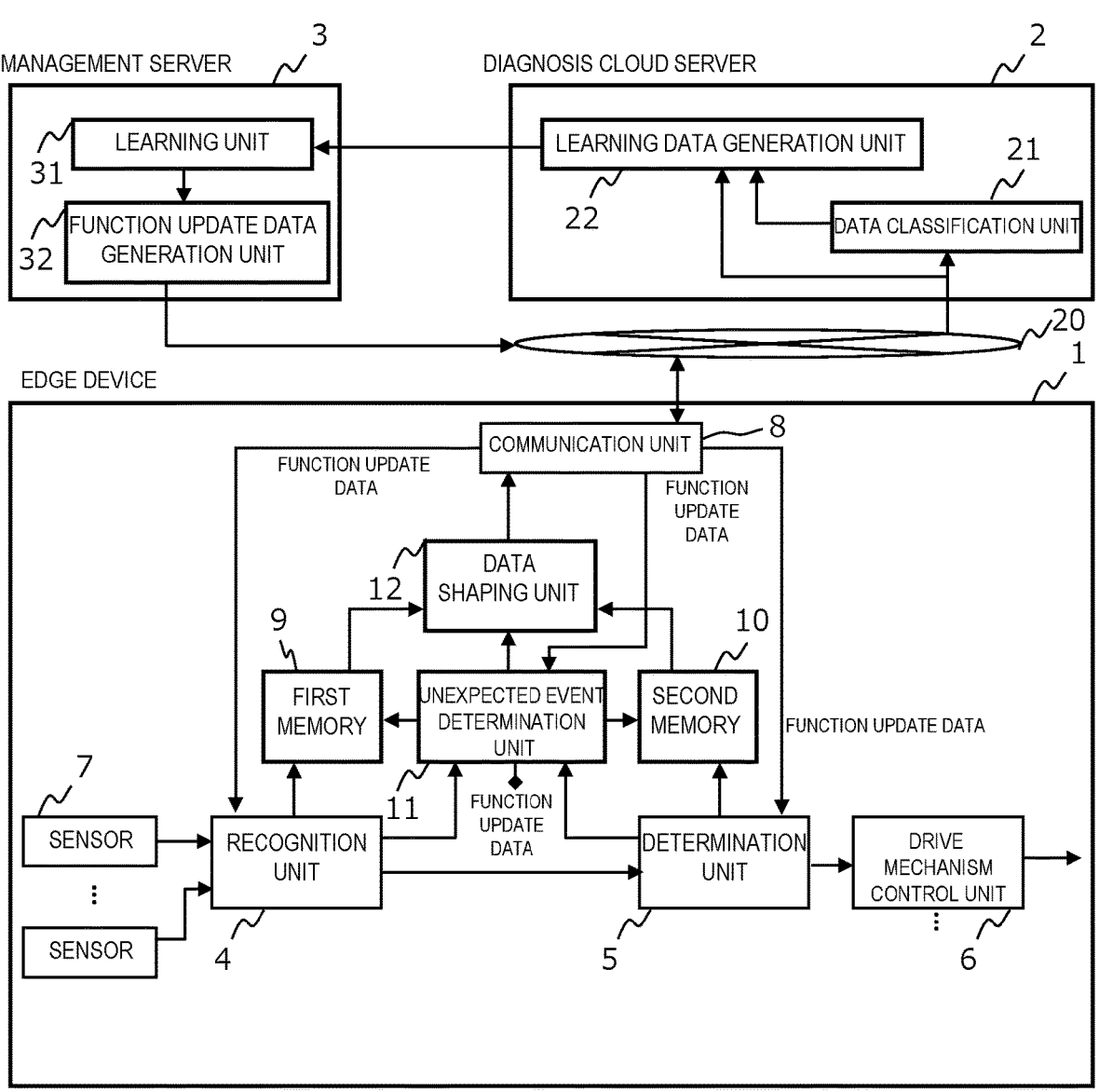
FIG. 1 is a diagram showing an overall configuration of a distributed system according to a first embodiment of the invention.

FIG. 1 is a diagram showing an overall configuration of a distributed system according to a first embodiment of the invention. The distributed system according to the present embodiment includes an edge device 1, a diagnosis cloud server 2, and a management server 3. The edge device 1 is connected to the diagnosis cloud server 2 and the management server 3 via a network 20. The network 20 is, for example, a two-way communication network represented by a mobile phone communication network, the Internet (including Ethernet), or the like.

(Configuration of Edge Device)

The edge device 1 is a device that supports control over a drive mechanism provided in an automatically operable moving body, and includes a sensor 7, a recognition unit 4, a determination unit 5, a drive mechanism control unit 6, a first memory 9, a second memory 10, an unexpected event determination unit 11, a data shaping unit 12, and a communication unit 8. A moving body such as a vehicle, a drone, and a robot, and equipment such as a robot arm, a machine tool, and a numerically controlled lathe are assumed as the automatically operable moving body. When the automatically operable moving body is a moving body, the drive mechanism is an engine or a motor, and when the automatically operable moving body is equipment, the drive mechanism is a motor or hydraulic pressure actuator. Here, it is assumed that an automatic operation includes automatic driving.

The sensor 7 is a camera, a radar, or the like provided in the automatically operable moving body. The recognition unit 4 recognizes what kind of object the sensed object is based on input data from the sensor 7, and converts the data into object data. The determination unit 5 performs determination on the object data that is a recognition result of the recognition unit 4, and determines the next operation of the automatically operable moving body, that is, a control content for the drive mechanism. The drive mechanism control unit 6 controls an operation of the drive mechanism based on a determination result of the determination unit 5.

The first memory 9 holds the object data that is the recognition result of the recognition unit 4 and/or the input data used for recognition of the recognition unit 4 (for example, raw data that is output from the sensor 7, such as image data and distance data). The second memory 10 holds the determination result of the determination unit 5 and/or a calculation history up to the determination result.

The unexpected event determination unit 11 determines whether an unexpected event has occurred based on information from the recognition unit 4 and the determination unit 5. Specifically, the unexpected event determination unit 11 determines whether the unexpected event has occurred by comparing, with a predetermined threshold, calculation history data up to the determination result of the determination unit 5 on the object data recognized by the recognition unit 4. When it is determined that the unexpected event has occurred, the unexpected event determination unit 11 issues a trigger signal for instructing the first memory 9 and the second memory 10 to hold data.

Here, an example of the unexpected event will be described. A first example is a case where an object can be recognized based on the input data from the sensor 7, but it is difficult to specify a shape based on the learned result (recognition may be successful). A second example is a case where a plurality of objects are recognized based on the input data from the sensor 7, but a combination thereof is unexpected (for example, a case where an automatic driving vehicle recognizes a road sign for temporary stop on an expressway). A third example is a case where a shape of an object in front (for example, a preceding vehicle or an oncoming vehicle of the automatic driving vehicle) appears to be missing due to an amount of light. A fourth example is a case where an unexpected event occurs due to a relationship with a surrounding environment (for example, a case where a parallel traveling vehicle of an automatic driving vehicle performs a sudden operation). The unexpected event is not limited to these examples.

Further, a rule base that stores scenario data on a normal operation and sensing data (such as shape data) on a recognizable object may be provided in the unexpected event determination unit 11. The unexpected event determination unit 11 can determine an unexpected event by sequentially comparing input data from the recognition unit 4 and the determination unit 5 with the rule base.

When the data shaping unit 12 acquires pieces of data held in the first memory 9 and the second memory 10, the data shaping unit 12 shapes the data as communication data by converting the data into a predefined format, and outputs the communication data to the communication unit 8.

The communication unit 8 transmits the communication data shaped by the data shaping unit 12 to the diagnosis cloud server 2 via the network 20. Of the components provided in the edge device 1, an actual state of the first memory 9 and the second memory 10 may be the same as a memory 402 of a computer shown in FIG. 2. Each unit provided in the edge device 1 may be implemented by a processor (a specific example is the same as a processor 401 of the computer shown in FIG. 2) executing a predetermined program. The example of FIG. 1 has been described based on an assumption that the units and the processors have a 1:1 relationship in which one processor is in charge of the recognition unit 4 and another processor is in charge of the determination unit 5, but the invention is not necessarily limited thereto. For example, a common processor may take charge of processing of each unit. The above is hardware provided in the edge device 1.

(Configuration of Diagnosis Cloud Server)

The diagnosis cloud server 2 includes one or more computers existing on the network 20. A server including one or more computers existing locally may be adopted in place of the cloud server. The diagnosis cloud server 2 includes a data classification unit 21 and a learning data generation unit 22.

The data classification unit 21 classifies types of unexpected events based on the communication data received from the edge device 1, that is, the pieces of data such as the input data (raw data), the object data, the determination result of the determination unit 5, and the calculation history up to the determination result. The data classification unit 21 determines whether learning is necessary based on a classification result, and outputs, to the learning data generation unit 22, data on that new learning is determined to be necessary.

The unexpected event determination unit 11 or the data shaping unit 12 of the edge device 1 may primarily classify the types of unexpected events and perform labeling. In this case, the data classification unit 21 of the diagnosis cloud server 2 only determines whether learning is necessary according to the label, or performs more detailed classification based on data input again, determines whether leaning is necessary, and extracts and labels a more effective part of data as learning data. Humans may also be involved in labeling.

The learning data generation unit 22 generates a learning data format and learning label data based on an output result from the data classification unit 21, the input data (raw data), the object data, and the like.

Figure 2:
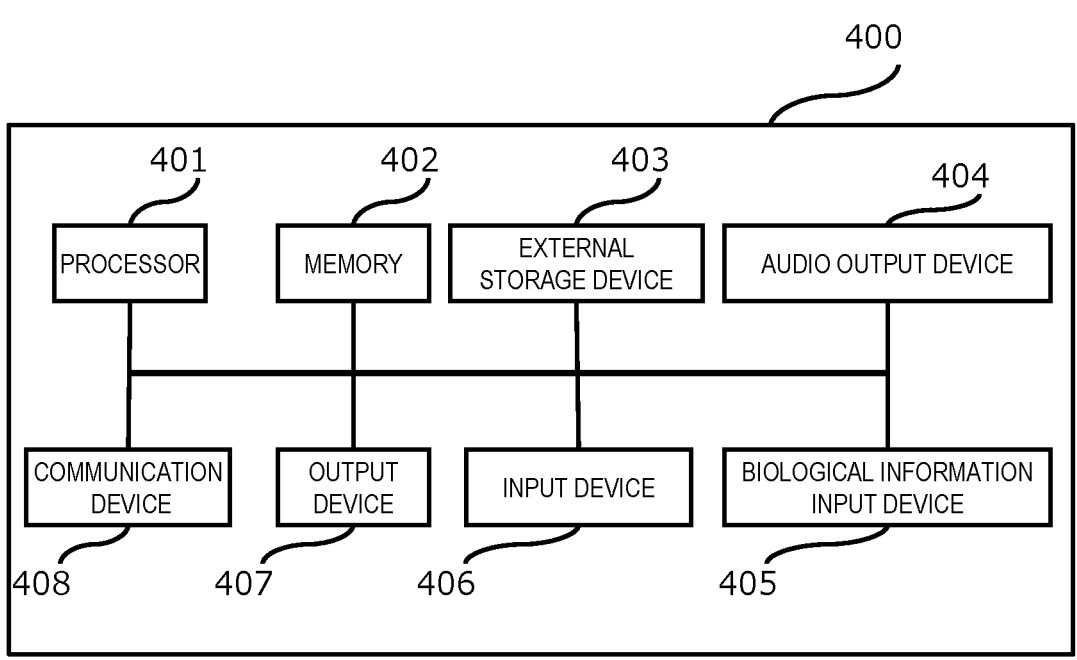
FIG. 2 is a diagram showing a hardware configuration of a computer constituting a diagnosis cloud server.

FIG. 2 is a diagram showing a hardware configuration of a computer 400 constituting the diagnosis cloud server 2.

The computer 400 includes a processor 401, a memory 402, an external storage device 403, an audio output device 404, a biological information input device 405, an input device 406, an output device 407, and a communication device 408, which are connected via a data bus 409.

The processor 401 includes a CPU, a GPU, an FPGA, or the like, and controls the entire computer 400. The memory 402 is a main storage device such as a random access memory (RAM). The external storage device 403 is a non-volatile storage device, such as a hard disk drive (HDD), a solid state drive (SSD), or a flash memory, capable of storing digital information.

The audio output device 404 includes a speaker or the like. The biological information input device 405 includes a camera, a line-of-sight input device, a microphone, or the like. The input device 406 includes a keyboard, a mouse, a touch panel, or the like. The output device 407 includes a display, a printer, or the like.

The communication device 408 includes a network interface card (NIC) or the like. The communication device 408 communicates with another device connected to the same network via at least one of wired communication and wireless communication. Packet communication based on a transmission control protocol/Internet protocol (TCP/IP) is adopted for the communication, but the invention is not limited thereto, and communication based on another protocol such as a user datagram protocol (UDP) may be adopted.

The hardware configuration of the computer 400 is not limited to the example described above, and some of the components described above may be omitted or other components may be provided. The computer 400 may be various information processing devices such as a server computer, a personal computer, a notebook computer, a tablet computer, a smartphone, and a television device.

The computer 400 can store programs such as an operating system (OS), middleware, and application programs and read the programs from the outside, and can execute various types of processing by the processor 401 executing these programs. The computer described in this specification may also have such a configuration. An example thereof is the management server 3.

(Configuration of Management Server)

A computer owned by a company (hereinafter, simply referred to as a manufacturing company in some cases) that designs and manufactures the automatically operable moving body and the edge device 1 is assumed as the management server 3. The manufacturing company manages edge data on the edge device 1 for development and maintenance of a product thereof. The management server 3 generates data for updating a function of the edge device 1 by executing learning processing based on the learning data, and distributes the data to the edge device 1. The learning data may be used for development of a new product by the manufacturing company.

A learning unit 31 receives the learning data generated by the diagnosis cloud server 2, and performs new learning based on processing contents (programs and setting parameters of the recognition unit 4, the determination unit 5, and the unexpected event determination unit 11) of the edge device 1 managed by the management server 3.

A function update data generation unit 32 converts learning result information (the programs, the setting parameters, neural network learning coefficient data, and the like) executed by the learning unit 31 into function update data in a format that can be written to the edge device 1, and distributes the function update data to the edge device 1 via the network 20.

The distributed function update data is received by the communication unit 8 of the edge device 1, and is written to at least one of the recognition unit 4, the determination unit 5, and the unexpected event determination unit 11. The learning using the learning data and generation of the function update data may be performed manually or by the diagnosis cloud server 2, instead of using the management server 3.

(Flow of Data in Distributed System)

Figure 3:
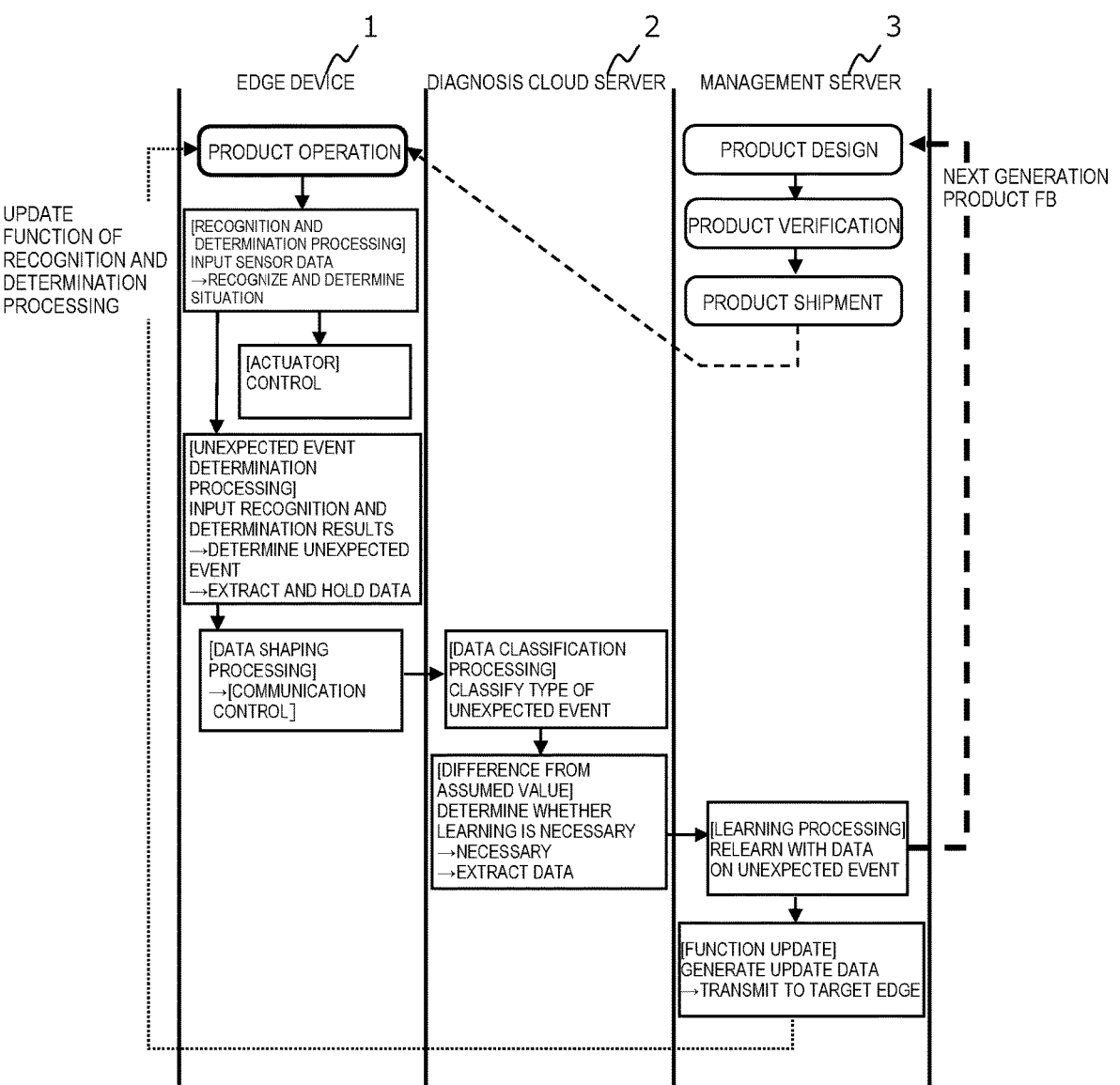
FIG. 3 is a diagram showing a flow of data in the distributed system shown in FIG. 1.

FIG. 3 is a diagram showing a flow of data in the distributed system shown in FIG. 1. In FIG. 3, operation states or processing contents of the edge device 1, the diagnosis cloud server 2, and the management server 3 are shown from a left side. Data input from the sensor 7, recognition of an object by the recognition unit 4, and determination by the determination unit 5 are performed during a product operation process of the edge device 1. A determination result of the determination unit 5 is transmitted to the drive mechanism control unit 6 and used to control the drive mechanism (actuator). These flows are main functions of the edge device 1, and are repeated in a normal operating state.

While the flow is repeated, the unexpected event determination unit 11 executes unexpected event determination processing. When it is determined that an unexpected event has occurred, the unexpected event determination unit 11 issues a trigger signal of a holding instruction to the first memory 9 and the second memory 10 to temporarily hold each data. Thereafter, the data shaping unit 12 converts the data held in each memory into a data format for communication, and the communication unit 8 transmits the data to the diagnosis cloud server 2 via the network 20.

The diagnosis cloud server 2 classifies the received data and generates learning data, and transmits the learning data to the management server 3. Based on the received learning data, the management server 3 learns a situation when the unexpected event occurs, generates function update data for the recognition unit 4, the determination unit 5, and the like of the edge device 1, and transmits the function update data to the edge device 1. Situation data and the learning data when the unexpected event occurs may be fed back to development of a next generation product in the manufacturing company of the edge device 1.

(Example of Automatic Driving Vehicle Service Using Distributed System)

FIG. 4 is a conceptual diagram showing an example of an automatic driving vehicle service using the distributed system. A product purchaser 41 (here, a purchaser of the automatic driving vehicle) transmits vehicle state data to a data management company 42 periodically or as needed. The data management company 42 owns the diagnosis cloud server 2, analyzes the data received by the diagnosis cloud server 2, and executes conversion processing. The data management company 42 transmits, to a system designer/manufacturer 43, image data that is surrounding environment information, data on a recognition result and a determination result (a distance from an oncoming vehicle, a relative speed, and the like), presence or absence of an operation abnormality of the vehicle, in-vehicle state data at the time of abnormality, and the like. These pieces of data are used, by the system designer/manufacturer 43, in a design for improving safety and reliability of a next generation system. The system designer/manufacturer 43 generates function update data for the vehicle in operation based on the collected data, and transmits the generated function update data to a data distributor 44. However, the data distributor 44 may be provided in one or both of the system designer/manufacturer 43 and the data management company 42. The data distributor 44 transmits the function update data to the product purchaser 41 via the network. For example, the function update data may be transmitted to a product operator/service provider 45 such as a passenger operator or a provider of mobility as a service (MaaS), and may be transmitted to the vehicle managed and used by the product operator/service provider 45.

(Example of Edge Device Mounted on Automated Driving Vehicle)

Figure 5:
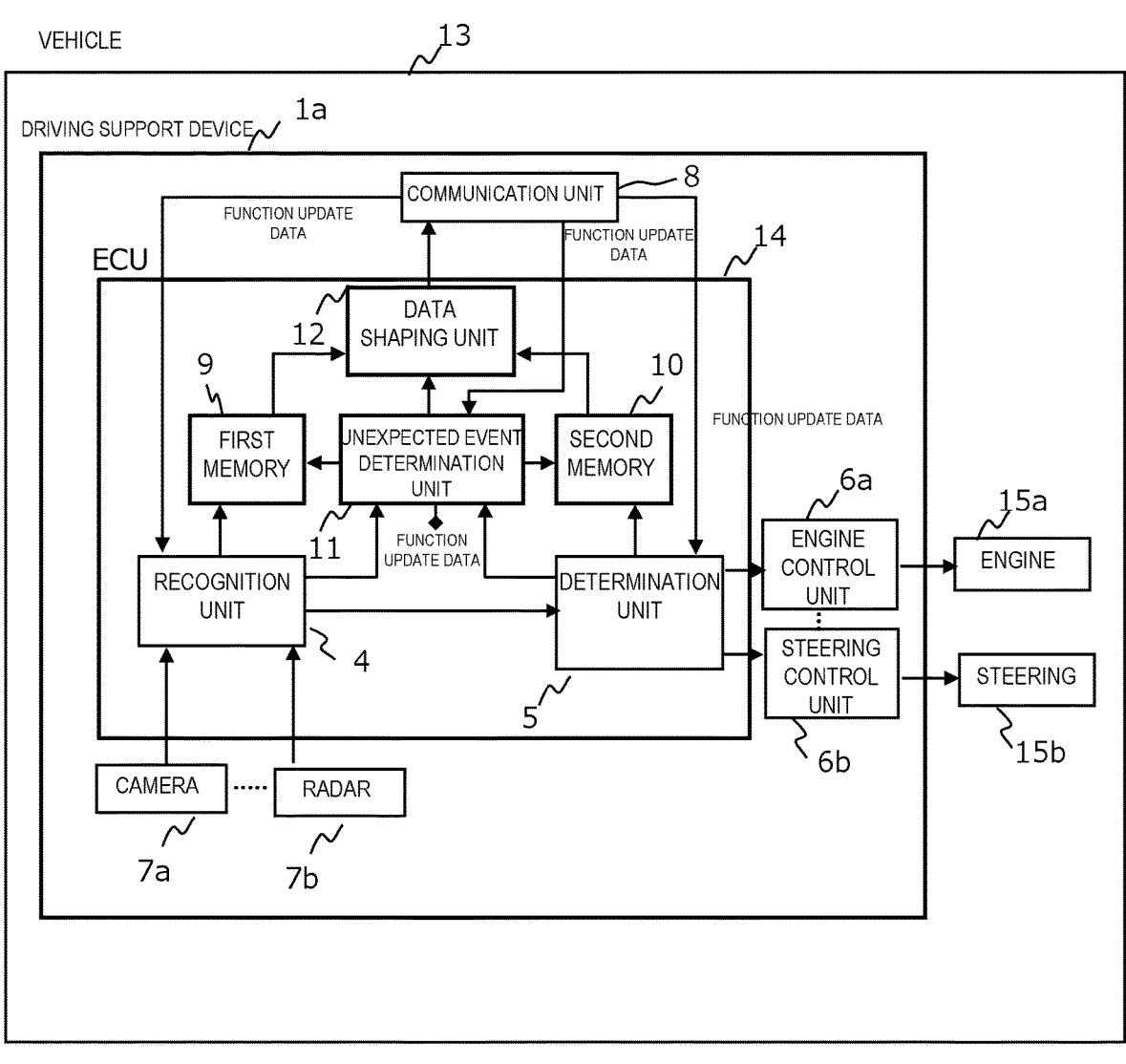
FIG. 5 is a diagram showing a hardware configuration of a driving support device in an automatic driving vehicle as an example of an edge device.

FIG. 5 is a diagram showing a hardware configuration of a driving support device in an automatic driving vehicle as an example of the edge device. When the automatically operable moving body is an automatic driving vehicle (moving body), the edge device is mounted on a vehicle 13 as a driving support device 1*a*. As shown in FIG. 4, the driving support device 1*a* (edge device) includes an electronic control unit (ECU) 14, the communication unit 8, sensors (a camera 7*a*, a radar 7*b*, and the like), and the drive mechanism control unit (an engine control unit 6*a* that controls an engine 15*a*, a steering control unit 6*b* that controls a steering 15*b*, and the like).

The ECU 14 includes the recognition unit 4, the determination unit 5, the first memory 9, the second memory 10, the unexpected event determination unit 11, and the data shaping unit 12. The recognition unit 4 recognizes an object such as another vehicle or a road sign based on the image data acquired by the camera 7*a*. The determination unit 5 determines how to move the vehicle in consideration of the position and speed of the object recognized by the recognition unit 4. The hardware configuration of the units provided in the driving support device 1*a* may be the same as that of the edge device 1 in FIG. 1.

Figure 6:
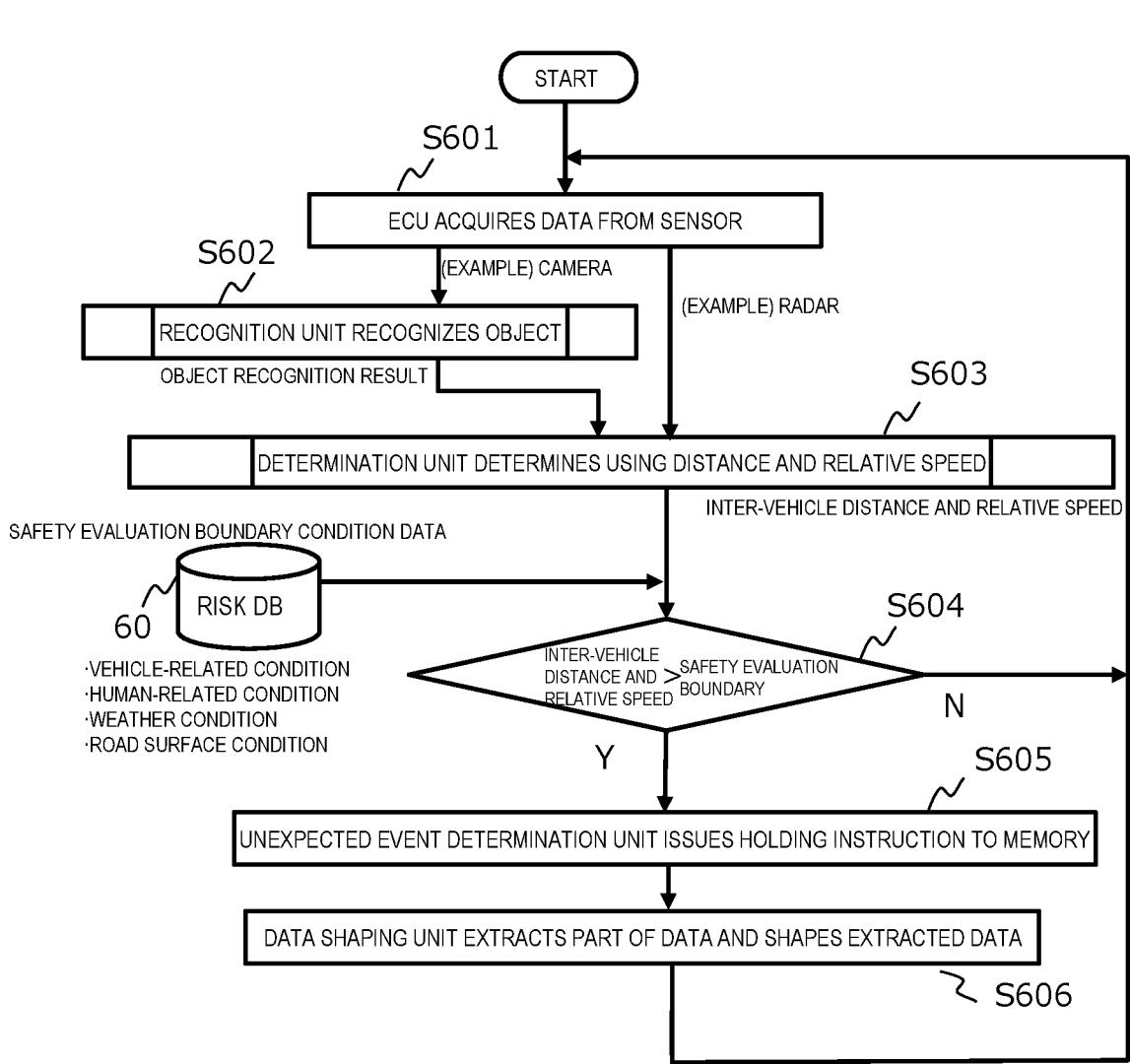
FIG. 6 is a flowchart showing processing in an ECU.

FIG. 6 is a flowchart showing processing in the ECU. First, the ECU 14 acquires input data such as image data from a sensor such as the camera 7*a* (step S601). Next, the recognition unit 4 recognizes an object based on the acquired input data (step S602). The determination unit 5 calculates, using distance information from a sensor such as the radar 7*b*, a distance from the recognized object (such as an inter-vehicle distance from another vehicle), a relative speed (such as a cut-in speed), and the like, and determines a control content for the drive mechanism control unit 6 (step S603). Thereafter, the unexpected event determination unit 11 compares a calculation history (the distance, the relative speed, and the like as the basis) up to a determination result of the determination unit 5 with various thresholds of safety evaluation boundary conditions (a vehicle-related condition, a human-related condition, a weather condition, a road surface condition, and the like) stored in a risk database 60 (step S604). When a safety evaluation boundary is exceeded, the unexpected event determination unit 11 determines that an unexpected event has occurred, and issues a trigger signal for instructing the first memory 9 and the second memory 10 to hold data (step S605). The data shaping unit 12 extracts only a part of the data from raw data having a large data amount such as the image data held in the first memory 9 in consideration of a communication load, and shapes the extracted data as communication data (step S606). The shaped communication data is transmitted to the diagnosis cloud server 2 by the communication unit 8.

(Examples of Unexpected Event in Automatic Driving Vehicle)

FIG. 7 is a table showing types of unexpected events that occur in the automatic driving vehicle due to a relationship with another vehicle. An unexpected event (also referred to as a traffic disturbance) due to the surrounding environment in the automatic driving vehicle is caused by a road shape, operations of an own vehicle and another vehicle, and a surrounding situation. Examples of the road shape include a case where it is difficult to understand a shape of a lane (a case where it is difficult to see or a case where it is likely to cause an illusion), a case where a merging road is present, a case where a branching road is present, and a case where a three-dimensional road is recognized as an unexpected shape. Examples of the operations of the own vehicle and the other vehicle include a case where a parallel traveling vehicle or a preceding vehicle traveling while maintaining a lane suddenly changes the lane. Examples of the surrounding situation include sudden cut-in of a surrounding vehicle, cut-out of a preceding vehicle, and sudden acceleration and deceleration.

Figure 8A:
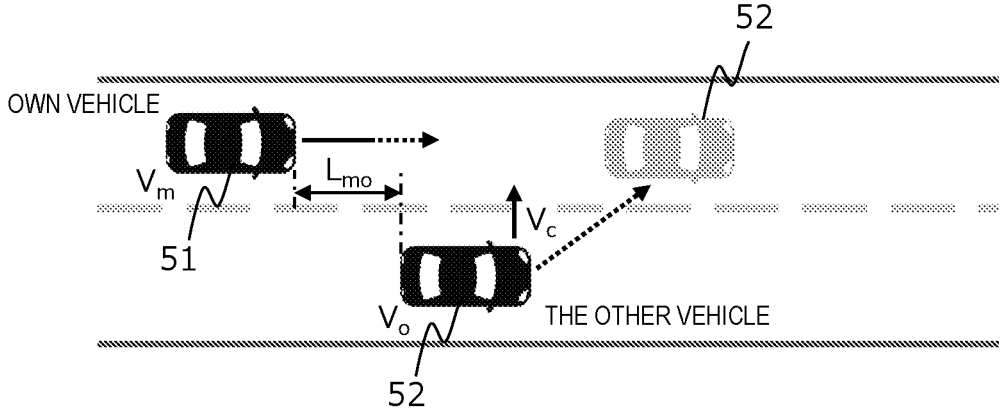
FIG. 8A is a schematic diagram showing a movement when another vehicle cuts in as an example of an unexpected event.
Figure 8B:
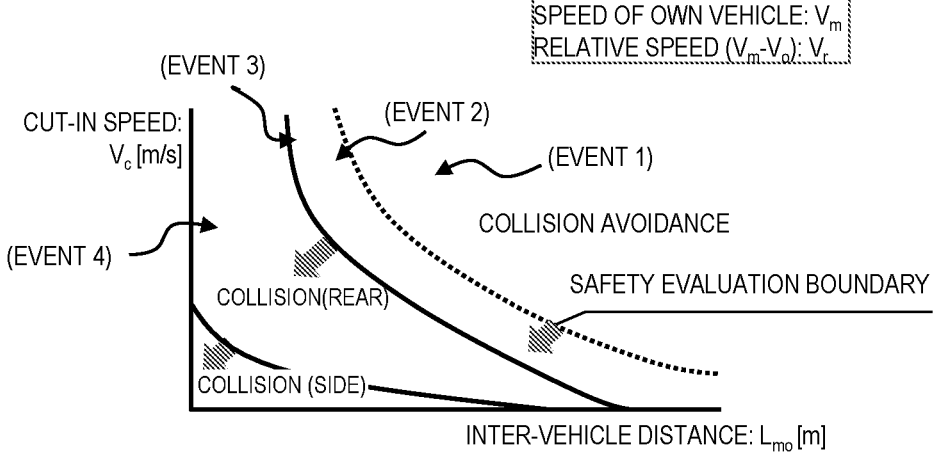
FIG. 8B is a graph showing a criterion for classifying the event when the other vehicle cuts in as in FIG. 8A.

FIG. 8A is a schematic diagram showing a movement when another vehicle cuts in as an example of the unexpected event, and FIG. 8B is a graph showing a criterion for classifying the event when the other vehicle cuts in as in FIG. 8A.

FIG. 8A shows the event in which the other vehicle 52 cuts into a left lane on which an own vehicle 51 travels from a right lane in a traveling direction with reference to the own vehicle 51. The own vehicle 51, which is an automatic driving vehicle, travels while constantly observing the other vehicle 52 using the sensor 7 disposed in front, and detecting a relative speed and an inter-vehicle distance with respect to the own vehicle 51. The determination unit 5, which does not include the ECU 14, of the own vehicle 51 calculates a positional relationship with the other vehicle 52 based on a speed of the own vehicle 51 in addition to data on the relative speed and the inter-vehicle distance, and determines whether there is a risk of collision.

In FIG. 8B, a horizontal axis represents an inter-vehicle distance $L_{mo}$ between the own vehicle 51 and the other vehicle 52, and a vertical axis represents a cut-in speed $V_c$ of the other vehicle 52. Collision time=inter-vehicle distance/relative speed, and a curve as a threshold for determining a possibility of collision is shown in a stepwise manner in FIG. 8B. A dotted line in FIG. 8B indicates a curve of a safety evaluation boundary, and when an event is beyond this curve and into an inner (lower left) area, the own vehicle 51 executes deceleration and stop control to avoid the collision. Solid lines in FIG. 8B respectively indicate curves leading to rear and side collisions, meaning that the own vehicle 51 collides with the other vehicle 52 when an event is beyond these curves and into an inner (lower left) area.

In the present embodiment, triggered by an unexpected event having a possibility of collision, input data from the sensor 7 and the like are transmitted to the diagnosis cloud server 2 regardless of presence or absence of an abnormality in an operation of the vehicle, and the diagnosis cloud server 2 collects vehicle information. The diagnosis cloud server 2 classifies the received data. Here, an event in which another vehicle cuts in can be classified into the following four events.

First, an (event 1) is in an area outside (on an upper right side of) the safety evaluation boundary in FIG. 8B, and can be handled without any problem even if the other vehicle cuts in. Since the (event 1) is an expected event, input data or the like on the event is not necessarily transmitted to the diagnosis cloud server 2, but may be transmitted to improve recognition accuracy of the object and treated as learning data. In particular, data when a possibility of collision (the curve of the safety evaluation boundary indicated by the dotted line in FIG. 8B) is approached is also transmitted even if an avoidance operation is not necessarily to be performed, whereby information such as a degree of margin of a threshold can be collected, and thus a sudden avoidance operation and a sudden stop of the vehicle can be prevented.

Next, an (event 2) is in an area between the safety evaluation boundary and the curve (rear) leading to a collision in FIG. 8B, and can be avoided with a margin even if the other vehicle cuts in. Since the (event 2) is an unexpected event, input data or the like on the event is transmitted to the diagnosis cloud server 2, treated as learning data, and used for resetting each threshold. The threshold is reset automatically by the diagnosis cloud server or manually based on a difference from an assumed value.

Further, an (event 3) is in an area between the safety evaluation boundary and the curve (rear) leading to a collision in FIG. 8B and particularly close to the latter curve, and can be avoided even by automatic driving, but should be handled by sudden braking of a person. Since the (event 3) is also an unexpected event, input data or the like on the event is transmitted to the diagnosis cloud server 2 and treated as learning data. The diagnosis cloud server 2 analyzes a recognition result of the vehicle, and reviews labels and generates additional learning data as necessary.

Then, an (event 4) is in an area inside (on a lower left side of) the curve (rear) leading to a collision in FIG. 8B, and may be difficult to avoid, so the automatic driving vehicle starts a fail operation and stops safely. Since the (event 4) is also an unexpected event, input data or the like on the event is transmitted to the diagnosis cloud server 2 and treated as learning data. The diagnosis cloud server 2 analyzes a recognition result of the vehicle, reviews labels, and generates additional learning data. The additional learning data is transmitted to the management server 3 and used for function update.

In the present embodiment, learning an unexpected event makes it possible to avoid a danger in a nearby event and to perform an avoidance operation with a margin before a dangerous situation occurs, and to further improve reliability and safety of the automatic driving vehicle. In the present embodiment, it is assumed that event classification as described above is performed by the data classification unit 21 of the diagnosis cloud server 2, but the event classification may be performed by the unexpected event determination unit 11 or the determination unit 5 of the edge device.

Figure 9:
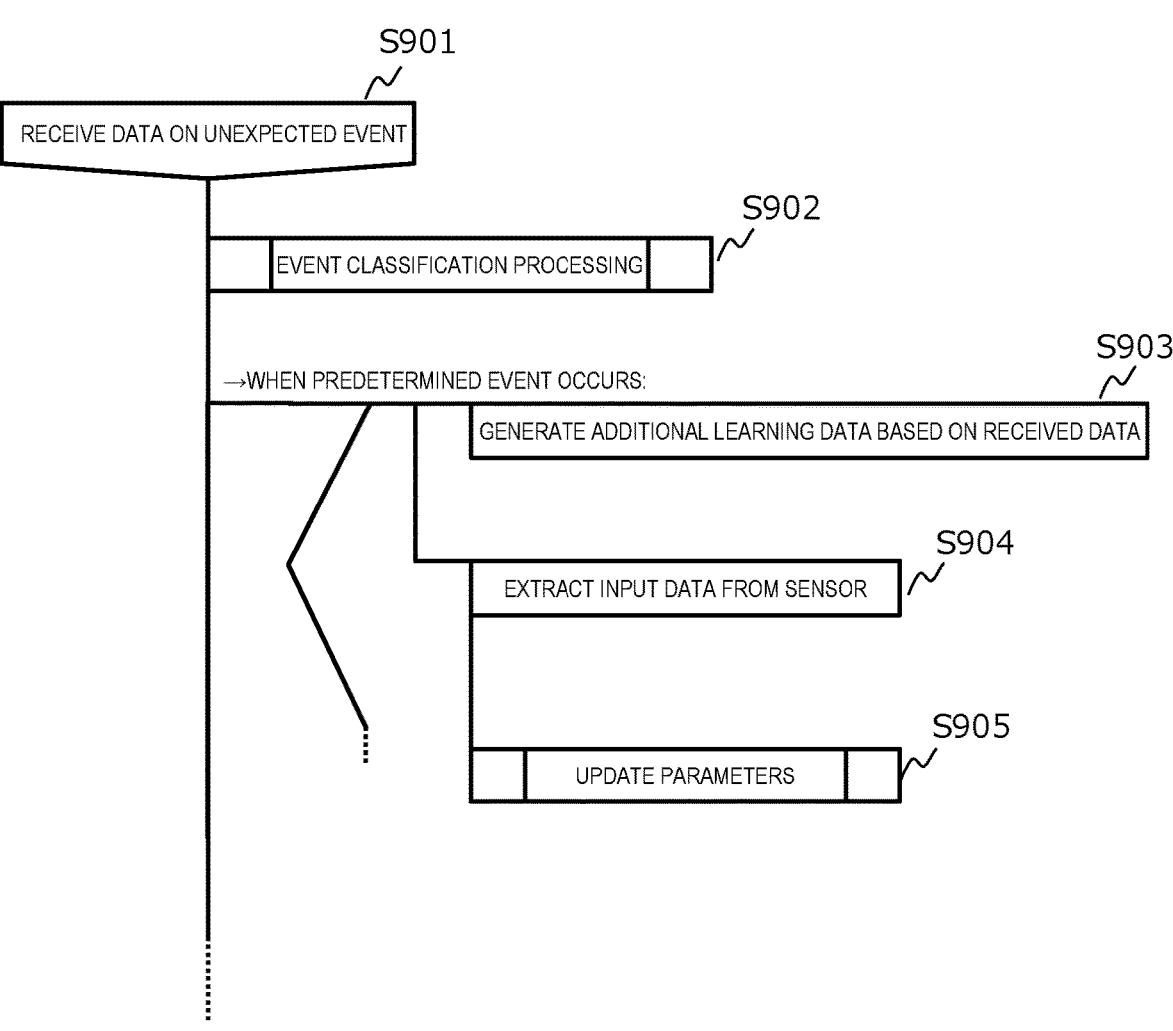
FIG. 9 is a flowchart showing an example of processing in the diagnosis cloud server.

FIG. 9 is a flowchart showing an example of processing in the diagnosis cloud server. First, when the diagnosis cloud server 2 receives, from the edge device 1 via the network 20, data on that an unexpected event is determined (step S901), the data classification unit 21 classifies the event (step S902). When an unexpected event of a predetermined classification occurs, the learning data generation unit 22 generates additional learning data based on data such as an image collected from the edge device 1 (step S903). For example, in a case of an event in which another vehicle cuts in as described above, additional learning data is generated when an unexpected event classified as the (event 3) or the (event 4) occurs.

Thereafter, the diagnosis cloud server 2 extracts input data from the sensor 7, for example, data on a movement (speed, direction, and the like) of the object acquired from the front, lateral, and rear sensors 7 (step S904). The diagnosis cloud server 2 generates function update data using the extracted data, and the function update data is distributed to the edge device 1 and reflected in parameters of the recognition unit 4 and the like (step S905). When the function update data is generated, for example, it is evaluated whether deceleration is effective for cut-in, whether a deceleration rate is appropriate, whether a lane change is effective, or the like. When a function of the edge device 1 is updated, for example, a recognition rate of a side surface of another vehicle that cuts in is improved.

In the example of FIG. 9, the diagnosis cloud server 2 performs learning and generation of the function update data, but as described above, the management server 3 may perform learning and generation of the function update data.

According to the distributed system described above, the edge device 1 cooperates with a computer such as the diagnosis cloud server 2, and situation data when various unexpected events occur in the automatically operable moving body can be efficiently collected. In particular, when it is determined that an unexpected avoidance operation or a change in the surrounding environment has occurred, the edge device 1 transmits sensor data and the like at the time of determination to the diagnosis cloud server 2, and thus an amount of collected data can be reduced. Then, safety and reliability can be continuously improved by analyzing the situation data on the unexpected event that has occurred, and by performing additional learning reflecting the analysis result and adjusting parameters.

Second Embodiment

Figure 10:
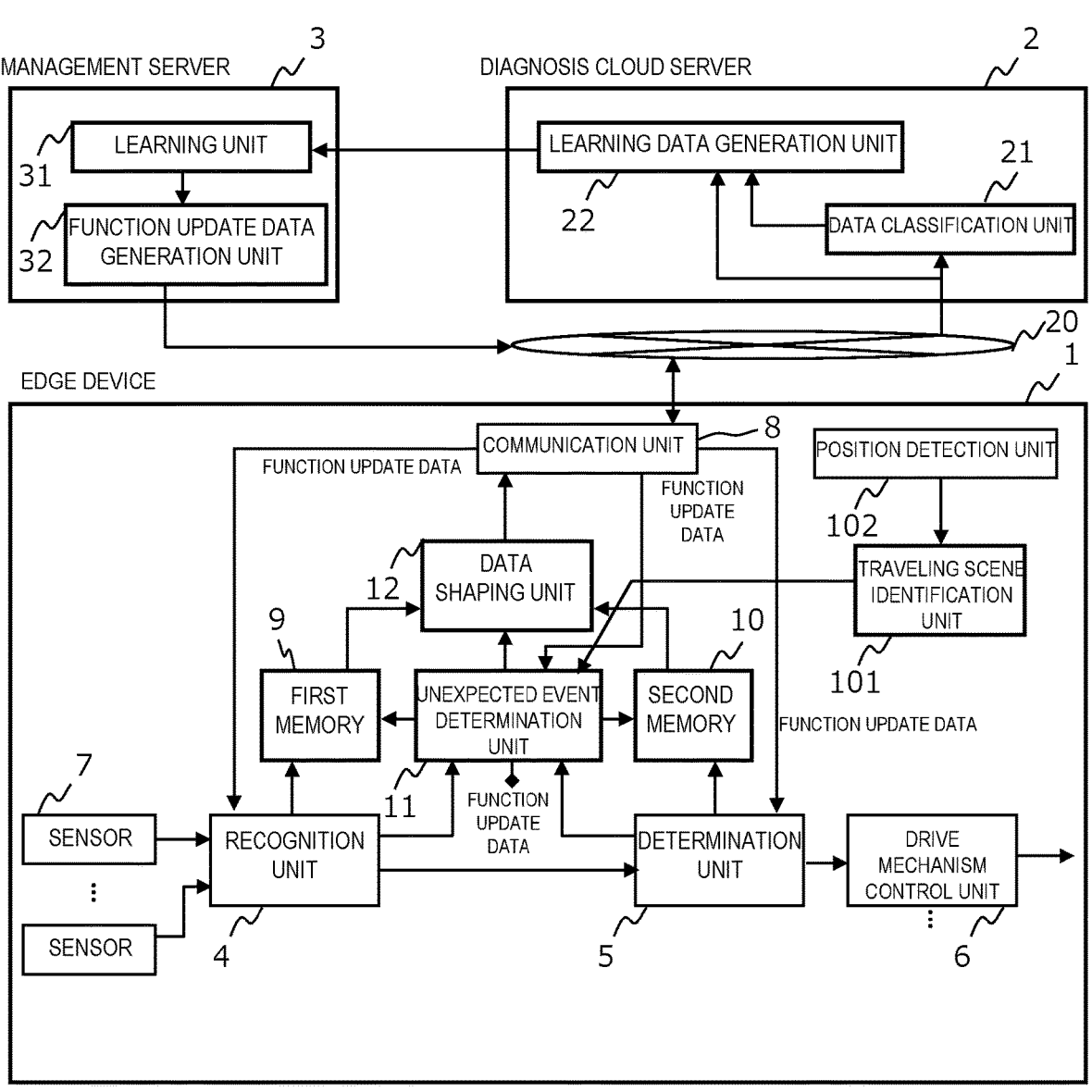
FIG. 10 is a diagram showing an overall configuration of a distributed system according to a second embodiment of the invention.

FIG. 10 is a diagram showing an overall configuration of a distributed system according to a second embodiment of the invention. Different from the edge device 1 according to the first embodiment, the edge device 1 according to the present embodiment further includes a traveling scene identification unit 101 that identifies a traveling scene of an automatically operable moving body and a position detection unit 102 that acquires position information on the automatically operable moving body. A hardware configuration of the units provided in the edge device 1 in this drawing may be the same as that of the edge device 1 in FIG. 1.

When the automatically operable moving body is an automatic driving vehicle, the position detection unit 102 acquires current location data using data from a global positioning system (GPS), or other artificial satellites. When receiving the current location data acquired by the position detection unit 102, the traveling scene identification unit 101 identifies, for example, a type of a road (a general road, an expressway, a road with high congestion, or the like) as a scene in which the automatic driving vehicle is traveling, and transmits a result thereof to the unexpected event determination unit 11. The traveling scene identification unit 101 includes a database of map information, and identifies the traveling scene based on map data and current location data. The database of the map information may not be provided in the edge device 1. For example, the edge device 1 may receive map information via the network 20, or may receive, by the position detection unit 102, data for identifying a traveling scene together with the current location data.

The unexpected event determination unit 11 according to the present embodiment determines whether an unexpected event has occurred under different conditions for each traveling scene identified by the traveling scene identification unit 101. For example, when the automatic driving vehicle is traveling on an expressway, a degree of importance is higher in a case where a relationship with another vehicle is unexpected than in a case where recognition regarding a road sign is unexpected. For this reason, when the automatic driving vehicle is traveling on the expressway, the latter case is more likely to be determined as an unexpected event than the former case, whereby data in the latter case can be preferentially transmitted to the diagnosis cloud server 2. In addition, it is possible to set conditions such as increasing a degree of importance of a relationship with humans when the automatic driving vehicle is traveling in a city, and increasing a degree of importance of recognition of a road sign when the automatic driving vehicle is traveling in a suburb.

According to the present embodiment, a communication load is reduced and data collection efficiency is improved as compared with a case where all data is transmitted to the diagnosis cloud server 2. When there is room in a communication environment, the diagnosis cloud server 2 may identify the traveling scene using the current location data or the like, and classify the events to be collected according to importance of each traveling scene.

Since the traveling scene identification unit 101 according to the present embodiment identifies the traveling scene using the current location data acquired by the position detection unit 102, the traveling scene can be identified with high accuracy, and thus the data collection accuracy is also improved. However, even when the position detection unit 102 is not provided, the traveling scene may be identified based on a traveling speed acquired by the sensor 7. For example, when the traveling speed is 100 km/h or more, the traveling scene identification unit 101 can identify that the vehicle is traveling on an expressway.

Third Embodiment

Figure 11:
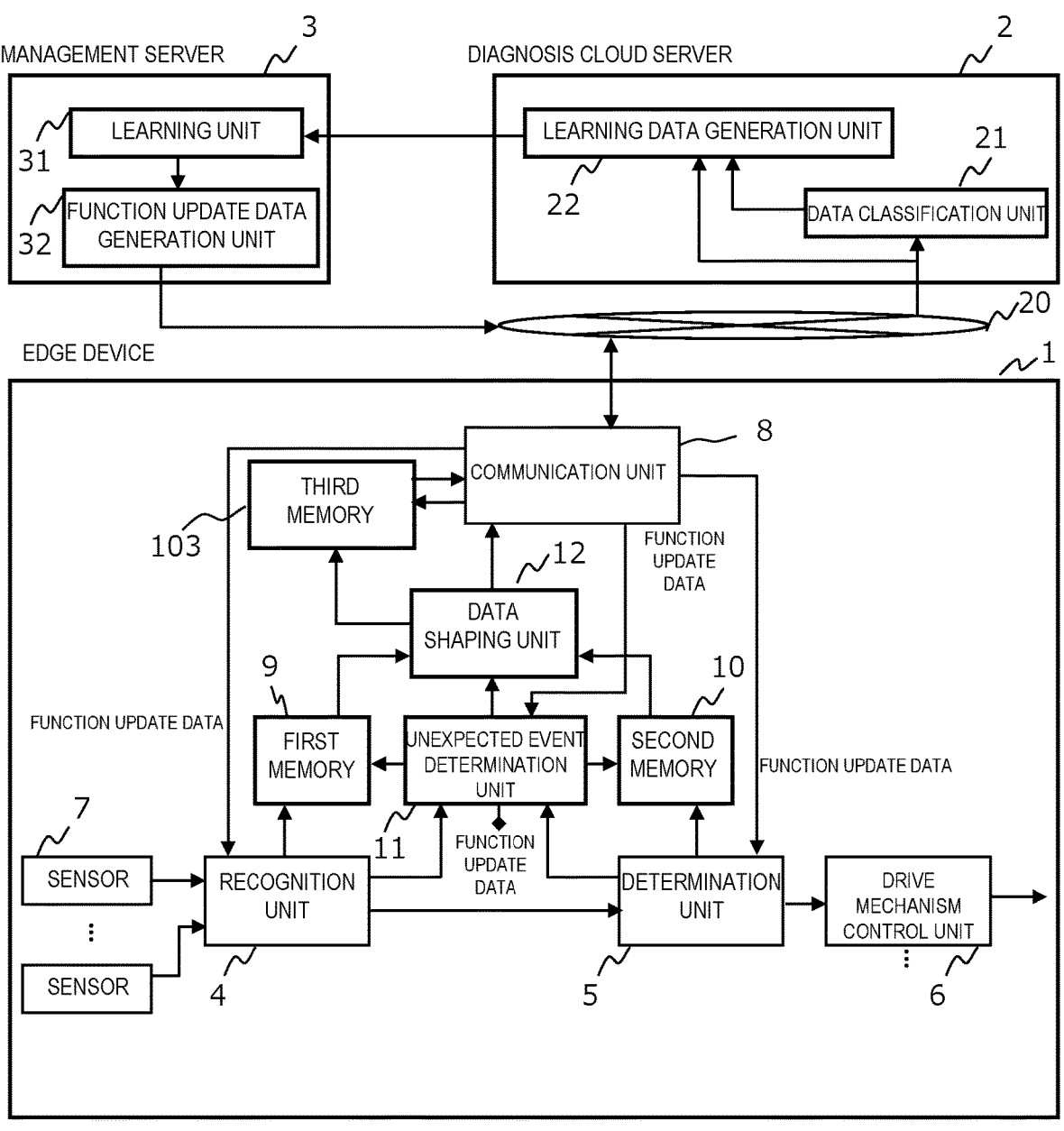
FIG. 11 is a diagram showing an overall configuration of a distributed system according to a third embodiment of the invention.

FIG. 11 is a diagram showing an overall configuration of a distributed system according to a third embodiment of the invention. Different from the edge device 1 according to the first embodiment, the edge device 1 according to the present embodiment further includes a third memory 103 that temporarily holds communication data shaped by the data shaping unit 12. A hardware configuration of the units provided in the edge device 1 in this drawing may be the same as that of the edge device 1 in FIG. 1.

The edge device 1 according to the present embodiment has a function of switching between a mode in which the communication data from the data shaping unit 12 is immediately transmitted to the diagnosis cloud server 2 without passing through the third memory 103, and a mode in which the communication data from the data shaping unit 12 is transmitted to the diagnosis cloud server 2 after being temporarily held by the third memory 103. Accordingly, the data can be reliably transmitted to the diagnosis cloud server 2, for example, even when the automatic driving vehicle, which is an automatically operable moving body, travels in a place in a poor radio wave state such as a tunnel or a mountain area.

The invention is not limited to the embodiments described above, and various modifications are possible. For example, the embodiments described above have been described in detail for easy understanding of the invention, and the invention is not necessarily limited to those including all the configurations described above. In addition, a part of the configuration of one embodiment may be replaced with or added to the configuration of another embodiment.

What is claimed is:

1. An edge device that is connected to a cloud server configured to collect data on an automatically operable moving body via a network and supports control over a drive mechanism provided in the automatically operable moving body, the edge device comprising:

a sensor provided in the automatically operable moving body;

a recognition unit configured to recognize an object based on input data from the sensor;

a determination unit configured to determine a recognition result of the recognition unit;

a drive mechanism control unit configured to control the drive mechanism based on a determination result of the determination unit;

an unexpected event determination unit configured to determine whether an unexpected event has occurred based on information from the recognition unit and the determination unit;

a data shaping unit, wherein when it is determined that an unexpected event has occurred, the data shaping unit shapes, as communication data, a recognition result of the recognition unit, or the input data used for recognition by the recognition unit, and a determination result of the determination unit, or a calculation history up to the determination result;

a communication unit configured to transmit, to the cloud server, the communication data shaped by the data shaping unit;

a first memory configured to hold a recognition result of the recognition unit and the input data used for recognition by the recognition unit; and a second memory separate from the first memory, the second memory being configured to hold a determination result of the determination unit and a calculation history up to the determination result, wherein when it is determined that an unexpected event has occurred the data shaping unit shapes, as communication data, a recognition result of the recognition unit, the input data used for recognition by the recognition unit, a determination result of the determination unit, and a calculation history up to the determination result, the unexpected event determination unit issues a trigger signal to the first memory and to the second memory instructing the first memory to hold raw data already contained in the first memory and instructing the second memory to hold data already contained in the second memory without rewriting the raw data already held in the first memory and the data already held in the second memory, and after the first memory receives the trigger signal instructing the first memory to hold the raw data already contained in the first memory, the data shaping unit extracts only a part of raw data held in the first memory and shapes the extracted part of the raw data as communication data, and the communication unit transmits the shaped and extracted part of the raw data to the cloud server.

2. The edge device according to claim 1, further comprising:

a traveling scene identification unit configured to identify a traveling scene of the automatically operable moving body, wherein the unexpected event determination unit determines whether an unexpected event has occurred under different conditions for each traveling scene identified by the traveling scene identification unit.

3. The edge device according to claim 2, further comprising:

a position detection unit configured to acquire current location data of the automatically operable moving body, wherein the traveling scene identification unit identifies a traveling scene based on the current location data and map data.

4. The edge device according to claim 1, further comprising:

a third memory configured to temporarily hold the communication data shaped by the data shaping unit, wherein switching is performed between a mode in which the communication data is transmitted to the cloud server via the third memory and a mode in which the communication data is transmitted to the cloud server without passing through the third memory.

5. A distributed system comprising:

an edge device configured to support control over a drive mechanism provided in an automatically operable moving body;

a diagnosis cloud server configured to generate learning data based on data received from the edge device; and a management server configured to generate function update data for the edge device using a result learned based on the learning data generated by the diagnosis cloud server, wherein the edge device includes a sensor provided in the automatically operable moving body;

a recognition unit configured to recognize an object based on input data from the sensor;

a determination unit configured to determine a recognition result of the recognition unit;

a drive mechanism control unit configured to control the drive mechanism based on a determination result of the determination unit;

an unexpected event determination unit configured to determine whether an unexpected event has occurred based on information from the recognition unit and the determination unit;

a data shaping unit, wherein when it is determined that an unexpected event has occurred, the data shaping unit shape, as communication data, a recognition result of the recognition unit, or the input data used for recognition by the recognition unit, and a determination result of the determination unit, or a calculation history up to the determination result;

a communication unit configured to transmit, to the diagnosis cloud server, the communication data shaped by the data shaping unit;

a first memory configured to hold a recognition result of the recognition unit and the input data used for recognition by the recognition unit; and a second memory separate from the first memory, the second memory being configured to hold a determination result of the determination unit and a calculation history up to the determination result, wherein when it is determined that an unexpected event has occurred the data shaping unit shapes, as communication data, a recognition result of the recognition unit, the input data used for recognition by the recognition unit, a determination result of the determination unit, and a calculation history up to the determination result, the unexpected event determination unit issues a trigger signal to the first memory and to the second memory instructing the first memory to hold raw data already contained in the first memory and instructing the second memory to hold data already contained in the second memory without rewriting the raw data already held in the first memory and the data already held in the second memory, and after the first memory receives the trigger signal instructing the first memory to hold the raw data already contained in the first memory, the data shaping unit extracts only a part of raw data held in the first memory and shapes the extracted part of the raw data as communication data, and the communication unit transmits the shaped and extracted part of the raw data to the cloud server.

6. The distributed system according to claim 5, wherein the diagnosis cloud server includes a data classification unit configured to classify types of unexpected events based on the communication data received from the edge device; and a learning data generation unit configured to generate learning data based on an output result from the data classification unit, and the management server includes a learning unit configured to perform learning based on the learning data received from the diagnosis cloud server; and a function update data generation unit configured to output a learning result by the learning unit as function update data for the edge device.

7. The distributed system according to claim 6, wherein the function update data generated by the management server is input to the recognition unit, the determination unit, or the unexpected event determination unit via the communication unit.

* * * * *